(12) United States Patent
Alrabady

(10) Patent No.: US 8,954,006 B2
(45) Date of Patent: Feb. 10, 2015

(54) COMPUTER TO VEHICLE WIRELESS LINK

(75) Inventor: Ansaf I Alrabady, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 286 days.

(21) Appl. No.: 13/160,875

(22) Filed: Jun. 15, 2011

(65) Prior Publication Data
US 2012/0322377 A1 Dec. 20, 2012

(51) Int. Cl.
H04B 7/00 (2006.01)
H04L 29/06 (2006.01)
H04W 12/06 (2009.01)
H04W 4/00 (2009.01)
H04W 4/04 (2009.01)

(52) U.S. Cl.
CPC ............ *H04L 63/083* (2013.01); *H04W 12/06* (2013.01); *H04W 4/008* (2013.01); *H04W 4/046* (2013.01)
USPC ........................................ 455/41.2; 455/41.1

(58) Field of Classification Search
None
See application file for complete search history.

(56) References Cited

U.S. PATENT DOCUMENTS

| 7,821,383 | B2 * | 10/2010 | Sultan et al. | 340/426.13 |
|---|---|---|---|---|
| 2003/0117293 | A1 * | 6/2003 | Tang et al. | 340/825.72 |
| 2004/0109441 | A1 * | 6/2004 | Hur et al. | 370/352 |
| 2006/0061458 | A1 * | 3/2006 | Simon et al. | 340/426.35 |
| 2009/0096575 | A1 * | 4/2009 | Tieman | 340/5.62 |
| 2009/0143012 | A1 * | 6/2009 | Jeon | 455/41.2 |
| 2010/0234071 | A1 * | 9/2010 | Shabtay et al. | 455/562.1 |
| 2011/0032075 | A1 | 2/2011 | Alrabady et al. | |
| 2011/0112969 | A1 * | 5/2011 | Zaid et al. | 705/50 |
| 2011/0163914 | A1 * | 7/2011 | Seymour | 342/357.42 |
| 2011/0234071 | A1 * | 9/2011 | Yu et al. | 312/334.1 |

FOREIGN PATENT DOCUMENTS

| CN | 101343961 A | 1/2009 |
|---|---|---|
| CN | 101718984 A | 6/2010 |
| WO | 2004085213 A1 | 10/2004 |

OTHER PUBLICATIONS

Chinese Office Action for Chinese Application Serial No. 201210197786.1, Mailed Jun. 30, 2014; 11 pages.

* cited by examiner

Primary Examiner — Fayyaz Alam
Assistant Examiner — Mohammed Rachedine
(74) Attorney, Agent, or Firm — Cantor Colburn LLP

(57) ABSTRACT

A wireless data link system between a vehicle having a vehicle controller and a computing device having a computing processor is provided. The wireless data link system includes a vehicle data link ("VDL") device and a computing data link ("CDL"). The VDL device has a VDL controller, a VDL memory, and a VDL interface circuitry. The VDL interface circuitry provides a connection to the vehicle controller for exchanging data. The VDL memory stores a passcode that provides a secure connection and a VDL recognizable code that is associated with the VDL device. The CDL device has a CDL controller, a CDL memory, and a CDL interface circuitry. The CDL interface circuitry provides a connection to the computing processor for exchanging data.

19 Claims, 2 Drawing Sheets

US 8,954,006 B2

COMPUTER TO VEHICLE WIRELESS LINK

FIELD OF THE INVENTION

Exemplary embodiments of the invention relate to a wireless data link system and, more particularly, to a wireless data link system between a vehicle and a computing device.

BACKGROUND

There is an increasing demand for vehicles that have the capability to communicate with remote devices wirelessly. Wireless data links, such as radio frequency (RF) data links, may be employed to communicate information between the vehicle and the remote device. One example of a wireless data link between the vehicle and a remote device is a telematics system such as, for example, OnStar®.

Sometimes issues may occur if the data link between the vehicle and the remote device is not secure, as most users do not want personal data to be sent over an unsecure network. Moreover, even if a secure data link is available, sometimes users do not have the knowledge, or are not confident in their ability, to set up a secure network. Also, some users may pick a password or passcode that is relatively easy to predict by someone who is trying to obtain unauthorized access to the secure network. For example, some users tend to pick passwords such as their birth date, their spouse's name, or relatively common passcodes such as the numeric string "1234". Accordingly, it is desirable to provide a wireless data link between a vehicle and a remote device that provides enhanced security.

SUMMARY OF THE INVENTION

In one exemplary embodiment of the invention a wireless data link system between a vehicle having a vehicle controller and a computing device having a computing processor is provided. The wireless data link system includes a vehicle data link ("VDL") device and a computing data link ("CDL") device. The VDL device has a VDL controller, a VDL memory, and a VDL interface circuitry. The VDL interface circuitry provides a connection to the vehicle controller for exchanging data. The VDL memory stores a passcode that provides a secure connection and a VDL recognizable code that is associated with the VDL device. The CDL device has a CDL controller, a CDL memory, and CDL interface circuitry. The CDL interface circuitry provides a connection to the computing processor for exchanging data. The CDL memory stores the passcode that provides a secure connection and a CDL recognizable code that is associated with the CDL device. The VDL controller and the CDL controller both include a control logic for searching over a short-range wireless network for one of the VDL device and the CDL device. The VDL controller and the CDL controller both include a control logic for detecting one of the VDL recognizable code and the CDL recognizable code. The VDL controller and the CDL controller both include a control logic for authenticating a short-range wireless connection between the VDL device and the CDL device. The short-range wireless connection is automatically authenticated and secured by the passcode. The VDL controller and the CDL controller both include a control logic for establishing the short-range wireless connection to transfer data between the vehicle controller and the computing processor.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
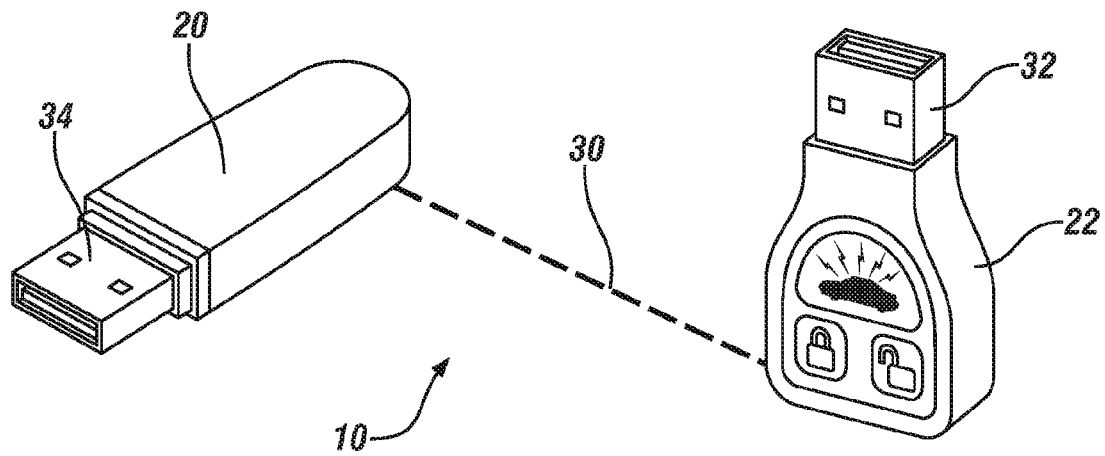
FIG. 1 is an exemplary illustration of a wireless data link system having a pair of data link devices in wireless communication with one another.

The following description is merely exemplary in nature and is not intended to limit the present disclosure, its application or uses. It should be understood that throughout the drawings, corresponding reference numerals indicate like or corresponding parts and features. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment of the invention, FIG. 1 is an illustration of a wireless data link system 10. The wireless data link system 10 includes a vehicle data link ("VDL") device 20 and a computing data link ("CDL") device 22. The VDL device 20 and the CDL device 22 communicate data between one another through a short-range wireless connection 30. The short-range wireless data connection 30 is any type of wireless signal for exchanging data over relatively short distances. For example, the short-range wireless connection may be a Bluetooth® signal conforming to IEEE Standard 802.15 or a Wi-Fi® signal conforming to IEEE standard 802.11, however it is to be understood that other approaches may be used as well.

In one embodiment, the VDL device 20 and the CDL device 22 are portable data linking devices that are relatively compact and lightweight, and may be easily carried by a user in a purse or wallet. In the exemplary embodiment as shown in FIG. 1, the CDL device 22 is a remote keyless entry key fob having a data communication interface 32. FIG. 1 illustrates the communication interface 32 as a universal serial bus (USB) interface, however it is understood that other data interface approaches may be used as well. The VDL device 20 also includes a data communication interface 34 as well.

Figure 2:
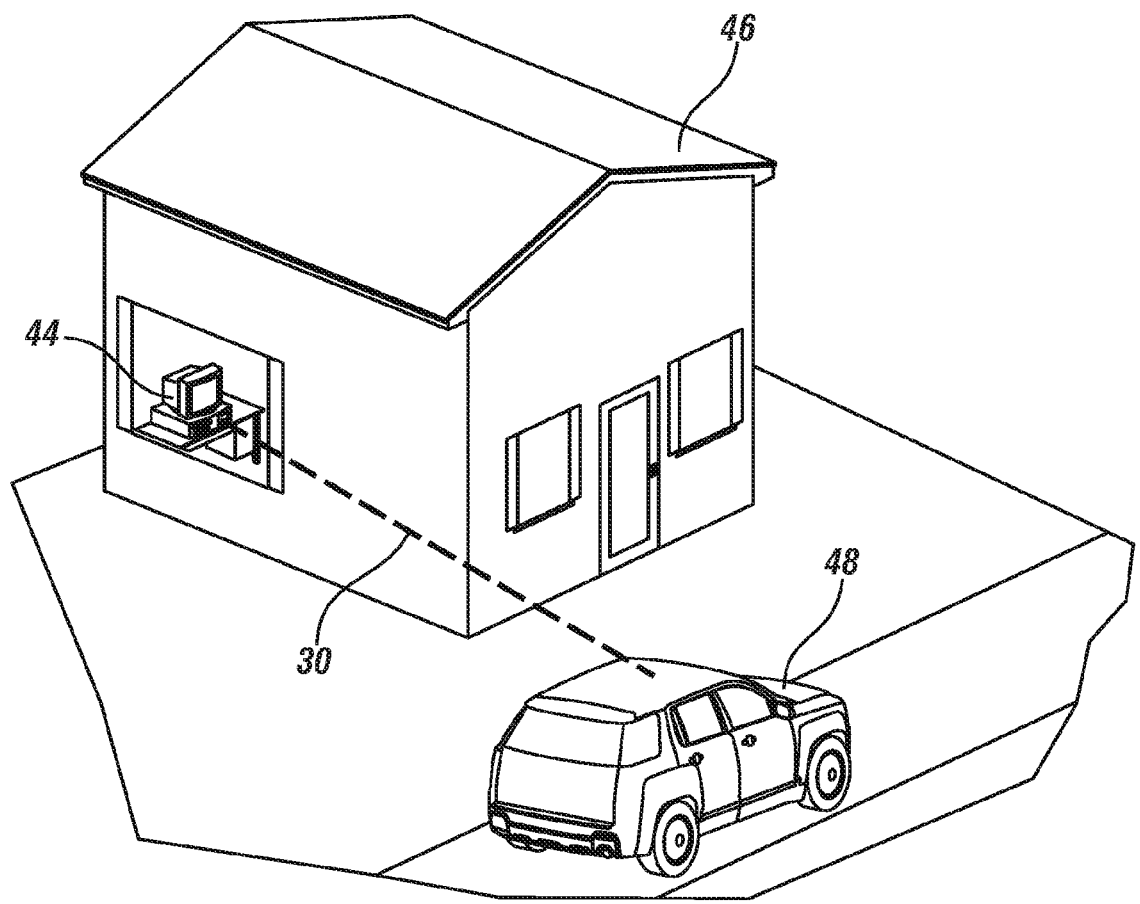
FIG. 2 is an illustration of the wireless data link system employed in a vehicle and by a computing device.
Figure 3:
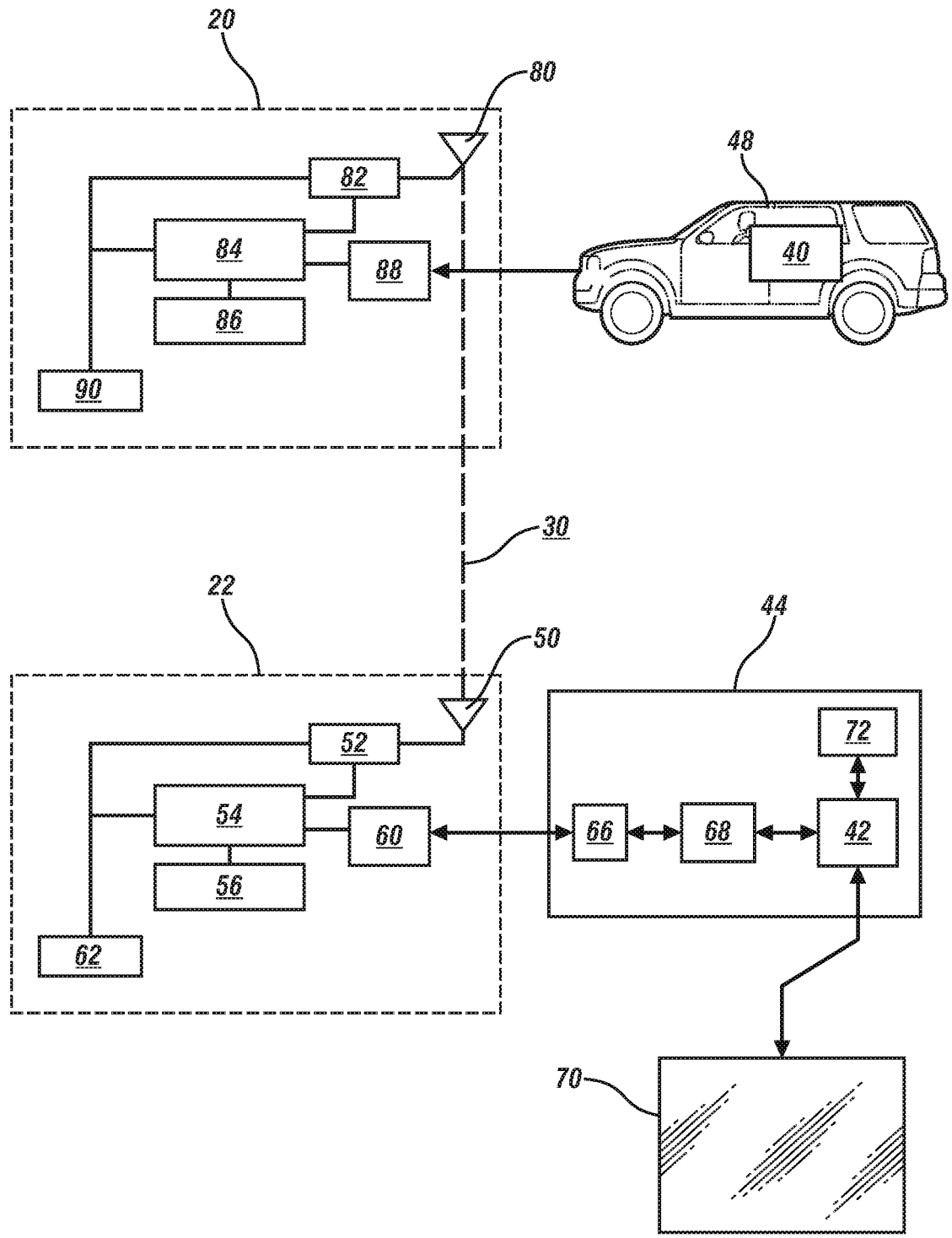
FIG. 3 is a block diagram of the data link devices shown in FIG. 1 and the vehicle and the computing device shown in FIG. 2.

The VDL device 20 is configured for sending and receiving data from a vehicle controller or processor 40 (shown in FIG. 3), and the CDL device 22 is configured for sending and receiving data from a computing device processor 42 (shown in FIG. 3). Turning now to FIG. 2, a computing device 44 is illustrated within a residence 46. In the embodiment as shown, the computing device 44 is a personal computer, however it is understood that the computing device 44 could also be a laptop, a tablet computer, or a handheld computing device such as a smartphone. FIG. 2 illustrates the computing device 44 being used within the residence 46, however, it is understood that the computing device 44 could also be used in a variety of different locations such as, for example, an office building. In yet another approach, the computing device 44 could be a service center diagnostic tool that is located in a dealership. Referring to both FIGS. 1-2, the CDL device 22 is connected to the computing device 44 through the communication interface 32. Specifically, the computing device 44 includes a communication interface (not shown) such as, for example, a USB interface, for receiving the communication interface 32 of the CDL device 22.

The computing device 44 is located within proximity to a vehicle 48 such that the VDL device 20 and the CDL device 22 communicate wirelessly over the short-range wireless data connection 30. The VDL device 20 is connected to the vehicle 48 through the communication interface 34. Specifically, the vehicle 48 also includes a communication interface (not shown) for receiving the communication interface 34 of the VDL device 20. In one embodiment the communication interface between the VDL device 20 and the vehicle 48 is a diagnostic port. Moreover, in yet another embodiment, the VDL device 20 is not a portable device, and is instead integrated in the vehicle 48. In still another embodiment, the CDL device 22 transmits a remote keyless entry wakeup message to the VDL device 20 that wakes up circuitry inside of the vehicle 48 without requiring starting the vehicle 48.

FIG. 3 is a simplified block diagram of the computing device 44, the CDL device 22, the VDL device 20, and the vehicle 48. The CDL device 22 includes a CDL antenna 50, CDL transceiver circuitry 52, a CDL controller 54, a CDL memory 56, CDL interface circuitry 60, and CDL power control circuitry 62. The CDL antenna 50 facilitates wireless communication of the CDL device 22 with the short-range wireless data connection 30. The CDL transceiver circuitry 52 is connected to the CDL controller 54 and the CDL antenna 50. The CDL controller 54 is connected to the CDL interface circuitry 60 to facilitate communication with the processor 42. In one embodiment, the CDL interface circuitry 60 is USB interface circuitry. The power circuitry 62 controls power that is used for operation of the CDL controller 54 and the CDL transceiver circuitry 52.

The CDL interface circuitry 60 facilitates communication between the processor 42 of the computing device 44 and the CDL controller 54 of the CDL device 22. The computing device 44 includes a driver 66 and an application 68. The driver 66 is a program or other software component that controls the communication between the processor 42 of the computing device 44 and the CDL controller 54 of the CDL device 22. Specifically, the driver 66 is employed to convert some of the general input and output instructions of the operating system that is run by the processor 42 into messages that the CDL controller 54 of the CDL device 22 is able to interpret and process. In one embodiment, the driver 66 is installed on the computing device 44 by an installation CD, or is downloaded from an Internet website. However, in another approach, the driver 66 is included with the CDL device 22. The application 68 provides the user interface needed to interact with the data transferred between the VDL device 20 and the CDL device 22. Specifically, the application 68 generates graphics that are displayed on a screen 70 of the CDL device 44. The graphics indicate the information that is being communicated over the short-range wireless data connection 30.

In one embodiment, the application 68 is included with the CDL device 22, and is run from the CDL device 22 to generate graphics that are displayed on the screen 70 of the computing device 44. Alternatively, in another embodiment, the application 68 is installed from the CDL device 22 on to the computing device 44 through a setup wizard or similar type of program that automatically installs the application 68 on the computing device 44. That is, a setup wizard will appear on the screen 70 the first time that the communication interface 34 (FIG. 1) of the CDL device 22 is connected to the computing device 44 to initiate installing the application 68 on the computing device 44. In yet another approach, the application 68 is installed on the computing device 44 by an installation CD or is downloaded from an Internet website.

The VDL device 20 includes a VDL antenna 80, a VDL transceiver circuitry 82, a VDL controller 84, a VDL memory 86, VDL interface circuitry 88, and VDL power control circuitry 90. The VDL antenna 80 connects the VDL device 20 to the short-range wireless data connection 30. The VDL transceiver circuitry 82 is connected to the VDL controller 84 and the VDL antenna 80. The VDL controller 84 is connected to the VDL interface circuitry 88 to facilitate communication with the vehicle controller 40 located in the vehicle 48. In one embodiment, the VDL interface circuitry 88 is USB interface circuitry. The VDL power circuitry 90 controls power that is used for operation of the VDL controller 84 and the VDL transceiver circuitry 82. The vehicle interface circuitry 88 facilitates a connection between the vehicle controller 40 of the vehicle 48 and the VDL controller 84 of the VDL device 20.

The vehicle controller 40 is typically any type of controller that communicates with a system or subsystem of the vehicle 48. For example, in one embodiment the vehicle controller could be an infotainment controller or a gateway controller that connects to the other controller or controllers in the vehicle 48, however it is to be understood that other types of vehicle controllers may be used as well. The vehicle controller 40 includes control logic for receiving and interpreting data from the short-range wireless data connection 30 through the VDL device 20.

The CDL controller 54 of the CDL device 22 includes control logic for translating and filtering information obtained from the processor 42 of the computing device 44 through the CDL interface circuitry 60, as well as information obtained from the vehicle controller 40 through the short-range wireless connection 30. The VDL controller 84 of the VDL device 20 also includes control logic for translating and filtering information obtained from the processor 42 of the computing device 44 through the short-range wireless network 30, as well as information obtained from the vehicle controller 40 through the VDL interface circuitry 88.

The application 68 provides the user interface needed to interact with the data transferred between the VDL device 20 and the CDL device 22. Specifically, in one embodiment the application 68 could generate a graphic that is displayed on the screen 70 that includes a plurality of tabs or buttons that each represent a different set of information. In one embodiment, one of the tabs could be labeled as 'Vehicle Files', and the files located under the tab 'Vehicle Files' are stored on the vehicle processor 40. The files could be any kind of data such as, for example, audio files that are played on the vehicle audio system (not shown). The application 68 allows for the driver 66 to communicate with the CDL controller 54 through the CDL interface circuitry 60. The CDL controller 54 is in communication with the VDL controller 84 through the short-range wireless data connection 30. The VDL controller 84 is in communication with the vehicle controller 40 through the VDL interface circuitry 88. Thus, the information stored on the vehicle controller 40 are communicated through the short-range wireless network 30, and are viewed on the screen 70. In another embodiment, one of the tabs could be labeled as 'Diagnostic Trouble Codes ("DTC")', and could include information regarding any DTCs that are stored in the vehicle controller 40. Specifically, the application 68 may include code that is able to interpret the DTCs that are stored on the vehicle controller 40 and translates the DTCs into messages that a user is able to interpret. The application 68 also generates the graphic that is displayed on the screen 70 indicating the message associated with a specific DTC.

The VDL device 20 and the CDL device 22 each include control logic for automatically authenticating and establishing the short-range wireless connection 30 between one another. That is, the VDL controller 84 of the VDL device 20 and the CDL controller 54 of the CDL device 22 each include control logic for establishing the short-range wireless connection 30. Continuing to refer to FIG. 3, the VDL memory 86 stores a passcode that authenticates the short-range wireless connection 30 and a recognizable code that is associated with the CDL device 22. The passcode is typically a string of characters, numbers, symbols or a combination of all three that is used to authenticate a secure short-range wireless connection 30 between the VDL device 20 and the CDL device 22. For example, in one embodiment employing Bluetooth®, the passcode is the code needed to pair the VDL device 20 and the CDL device 22 together. The recognizable code is the device address of the CDL device 22. Specifically, in one embodiment utilizing Bluetooth®, the recognizable code is the Bluetooth® device address of the CDL device 22. The CDL link memory 56 stores a passcode that authenticates the short-range wireless connection 30 as well as a recognizable code that is associated with the VDL device 20.

Both the VDL controller 84 of the VDL device 20 and the CDL controller 54 of the CDL device 22 include control logic for searching over the short-range wireless network for one another. Specifically, the CDL controller 54 of the CDL device 22 includes control logic for searching over the short-range wireless network for the VDL device 20. The VDL controller 84 of the VDL device 20 includes control logic for searching over the short-range wireless network for the CDL device 22. Both the VDL controller 84 of the VDL device 20 and the CDL controller 54 of the CDL device 22 each include control logic for detecting the recognizable code that is associated with one another. That is, the CDL controller 54 of the CDL device 22 includes control logic for detecting the recognizable code that is associated with the VDL device 20. The VDL controller 84 of the VDL device 20 includes control logic for detecting the recognizable code that is associated with the CDL device 22.

Both the VDL controller 84 of the VDL device 20 and the CDL controller 54 of the CDL device 22 include control logic for authenticating the short-range wireless connection 30 between one another. That is, the short-range wireless connection 30 is automatically authenticated without requiring a user to input the passcode. This is because the passcode that authenticates the short-range wireless connection 30 is stored in the VDL memory 86 and the CDL memory 56. For example, in one embodiment employing a Bluetooth® connection, the VDL device 20 and the CDL device 22 are pre-paired with one another. Therefore, a user will not have to create his or her own passcode to establish the short-range wireless connection 30 between the VDL device 20 and the CDL device 22. Some users tend to select a password that is relatively easy to predict. For example, some users tend to pick passwords such as their birth date or their spouse's name. In contrast, the passcode stored in the in the VDL memory 86 and the CDL memory 56 is generated at random. This random passcode reduces or substantially prevents the possibility of an unauthorized user being able to predict the passcode, and enhances the secure connection between the VDL device 20 and the CDL device 22. The VDL controller 84 of the VDL device 20 and the CDL controller 54 of the CDL device 22 include control logic for then establishing the short-range wireless connection 30.

The wireless data link system 10 is employed to transfer data between the vehicle 48 and the computing device 44 in a variety of different applications. For example, in one application the wireless data link system 10 is employed to obtain navigation data such as map data, route information, or satellite images from the Internet accessed by the computing device 44. The navigational data is then sent to the vehicle controller 40 over the short-range wireless network 30. In another approach, information stored in the vehicle controller 40 such as, for example, diagnostic trouble codes or tire pressure is sent over the short-range wireless connection 30 and to the computing device 44. The information from the vehicle controller 40 may then be viewed on the screen 70. In yet another application, software updates for the vehicle controller 40 may be accessed from the Internet by the computing device 44. The software updates may then be sent to the vehicle controller 40 over the short-range wireless network 30.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A wireless data link system between a vehicle having a vehicle controller and a computing device having a computing processor, comprising:

a vehicle data link ("VDL") device having a VDL controller, a VDL memory, and a VDL interface circuitry, the VDL interface circuitry providing a connection to the vehicle controller for exchanging data, the VDL memory storing a passcode that provides a secure connection and a VDL recognizable code that comprises a device address of the VDL device; and a computing data link ("CDL") device having a CDL controller, a CDL memory, and CDL interface circuitry, the CDL interface circuitry providing a connection to the computing processor for exchanging data between the CDL and the computing processor, the CDL removably coupled to the computing processor via the CDL interface circuitry, the CDL memory storing the passcode that provides a secure connection and a CDL recognizable code that comprises a device address of the CDL device, the VDL device and the CDL device being pre-paired with one another, the VDL controller and the CDL controller both including control logic operable for implementing:

searching over a short-range wireless network for one of the VDL device and the CDL device;

detecting one of the VDL recognizable code and the CDL recognizable code;

authenticating a short-range wireless connection between the VDL device and the CDL device, the short-range wireless connection being automatically authenticated and secured by the passcode; and establishing the short-range wireless connection to transfer data between the vehicle controller and the computing processor, the data including navigational data that is acquired by the computing processor, the computing processor being remote from the vehicle, and the navigational data is transferred to the vehicle controller over the short-range wireless connection.

2. The wireless data link system of claim 1, wherein the short-range wireless connection is based on one of the IEEE 802.15 standard and the IEEE 802.11 standard.

3. The wireless data link system of claim 1, wherein the computing processor is part of one of a personal computer, a tablet computer, service center diagnostic tool and a handheld computing device, and wherein a user of the vehicle and the computing device has ownership interest in the vehicle.

4. The wireless data link system of claim 1, wherein the CDL interface circuitry and the VDL interface circuitry each comprise universal serial bus ("USB") interface circuitry.

5. The wireless data link system of claim 1, wherein the CDL device is a remote key FOB.

6. The wireless data link system of claim 1, wherein the CDL device includes an application that generates graphics that are configured to be displayed on a screen of the computing device.

7. The wireless data link system of claim 1, wherein the CDL device includes an application that is installed from the CDL device on to the computing device through a setup wizard, wherein the setup wizard appears as a graphic on a screen of the computing device.

8. The wireless data link system of claim 1, wherein the CDL device and the VDL device are each portable data linking devices, and the VDL device is integrated in the vehicle.

9. The wireless data link system of claim 1, wherein the CDL device includes a driver that converts general input and output instructions of an operating system that is run by the computing processor into messages that the CDL controller interprets and processes.

10. The wireless data link system of claim 1, wherein the computing processor is part of a service center diagnostic tool and information stored in the vehicle controller is transferred to the computing processor over the short-range wireless connection.

11. A wireless data link system between a vehicle having a vehicle controller and a computing device having a computing processor, comprising:
a portable VDL device having a VDL controller, a VDL memory, and a VDL interface circuitry, the VDL interface circuitry providing a connection to the vehicle controller for exchanging data, the VDL memory storing a randomly generated passcode that provides a secure connection and a VDL recognizable code that comprises a device address of the portable VDL device; and
a portable CDL device comprising a key fob, the portable CDL device having a CDL controller, a CDL memory, and CDL interface circuitry, the CDL interface circuitry providing a connection to the computing processor for exchanging data between the portable CDL device and the computing processor, the portable CDL device removably coupled to the computing processor via the CDL interface circuitry, the CDL memory storing the passcode that provides a secure connection and a CDL recognizable code that comprises a device address of the portable CDL device, the portable VDL device and the portable CDL device being pre-paired with one another,
the VDL controller and the CDL controller both including control logic operable for implementing:
searching over a short-range wireless network for one of the portable VDL device and the portable CDL device;
detecting one of the VDL recognizable code and the CDL recognizable code;
authenticating a short-range wireless connection between the portable VDL device and the portable CDL device, the short-range wireless connection being automatically authenticated and secured by the passcode; and
establishing the short-range wireless connection to transfer data between the vehicle controller and the computing processor, the data including navigational data that is acquired by the computing processor, the computing processor being remote from the vehicle, and the navigational data is transferred to the vehicle controller over the short-range wireless connection.

12. The wireless data link system of claim 11, wherein the short-range wireless connection is based on one of the IEEE 802.15 standard and the IEEE 802.11 standard.

13. The wireless data link system of claim 11, wherein the CDL interface circuitry and the VDL interface circuitry each comprise universal serial bus ("USB") interface circuitry.

14. The wireless data link system of claim 11, wherein the 1 portable CDL device includes an application that generates graphics that are configured to be displayed on a screen of the computing device.

15. The wireless data link system of claim 11, wherein the 1 portable CDL device includes an application that is installed from the portable CDL device on to the computing device through a setup wizard, wherein the setup wizard appears as a graphic on a screen of the computing device.

16. A wireless data link system between a vehicle having a vehicle controller and a computing device having a computing processor, comprising:
a portable VDL device having a VDL controller, a VDL memory, and a VDL interface circuitry, the VDL interface circuitry providing a connection to the vehicle controller for exchanging data, the VDL memory storing a randomly generated passcode that provides a secure connection and a VDL recognizable code that comprises a device address of the portable VDL device; and
a portable CDL device having a CDL controller, a CDL memory, and CDL interface circuitry, the CDL interface circuitry providing a connection to the computing processor for exchanging data between the portable CDL device and the computing processor, the portable CDL device removably coupled to the computing processor via the CDL interface circuitry, the CDL memory storing the passcode that provides a secure connection and a CDL recognizable code that comprises a device address of the portable CDL device, the VDL device and the CDL device being pre-paired with one another,
the VDL controller and the CDL controller both including control logic operable for implementing:
searching over a short-range wireless network for one of the portable VDL device and the portable CDL device;
detecting one of the VDL recognizable code and the CDL recognizable code;
authenticating a short-range wireless connection between the portable VDL device and the portable CDL device, the short-range wireless connection being automatically authenticated and secured by the passcode, the short-range wireless connection is based on the IEEE 802.15 standard; and
establishing the short-range wireless connection to transfer data between the vehicle controller and the computing processor, the data including navigational data that is acquired by the computing processor, the computing processor being remote from the vehicle, and the navigational data is transferred to the vehicle controller over the short-range wireless connection.

17. The wireless data link system of claim 1, wherein the computing processor is part of a personal computer and the data includes audio files transferred from the computing processor to the vehicle controller over the short-range wireless connection for play on an audio system of the vehicle.

18. The wireless data link system of claim 1, wherein the VDL device is a portal device and is removably connected to the vehicle controller by a bus provided by the VDL interface circuitry.

19. The wireless data link system of claim 1, wherein the navigational data includes a driving route.

\* \* \* \* \*